United States Patent
Mildner et al.

(10) Patent No.: US 9,834,253 B2
(45) Date of Patent: Dec. 5, 2017

(54) ROOF PANEL FOR A MOTOR VEHICLE

(71) Applicant: GM GLOBAL TECHNOLOGY OPERATIONS LLC, Detroit, MI (US)

(72) Inventors: Udo Mildner, Ruesselsheim (DE); Lothar Teske, Aschaffenburg (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/005,484

(22) Filed: Jan. 25, 2016

(65) Prior Publication Data

US 2016/0214651 A1 Jul. 28, 2016

(30) Foreign Application Priority Data

Jan. 24, 2015 (DE) .................. 10 2015 000 866

(51) Int. Cl.
*B62D 25/06* (2006.01)
*B62D 29/00* (2006.01)

(52) U.S. Cl.
CPC ........... *B62D 25/06* (2013.01); *B62D 29/004* (2013.01)

(58) Field of Classification Search
CPC .... B62D 25/06; B62D 29/004; B62D 29/005; B62D 65/02; B32B 15/02; B32B 15/04; B32B 15/08
USPC ................. 442/1, 6, 7, 8, 43, 45, 50, 52, 58
See application file for complete search history.

(56) References Cited

U.S. PATENT DOCUMENTS

| 5,050,928 A | 9/1991 | Böhm et al. |
| 6,273,500 B1 | 8/2001 | Boersma et al. |
| 2012/0231244 A1 | 9/2012 | Legler et al. |
| 2014/0159425 A1 * | 6/2014 | Kim ...................... B62D 25/06 296/191 |

FOREIGN PATENT DOCUMENTS

| DE | 2742789 A1 * | 4/1979 | ......... B60R 13/0225 |
| DE | 19731903 A1 | 1/1999 | |
| DE | 102008032334 A1 | 1/2010 | |
| WO | 2014012761 A1 | 1/2014 | |

OTHER PUBLICATIONS

Translation of DE 2742789; published Apr. 5, 1979.*
German Patent Office, German Search Report for German Application No. 102015000866.8, dated Oct. 8, 2015.

* cited by examiner

*Primary Examiner* — Catherine A Simone
(74) *Attorney, Agent, or Firm* — Lorenz & Kopf, LLP

(57) ABSTRACT

A roof panel for the passenger cabin of a motor vehicle includes a composite or plastic panel-like body and a metal frame that runs continuously along a periphery of the plastic body. The metal frame prevents the thermal expansion of the plastic body at high temperatures, so the expansion of the entire roof panel approximates that of an equivalent metal roof panel. Specifically, the uninterrupted encircling structure of the frame absorbs forces resulting from thermal expansion of the plastic body.

16 Claims, 3 Drawing Sheets

ROOF PANEL FOR A MOTOR VEHICLE

CROSS-REFERENCE TO RELATED APPLICATION

This application claims priority to German Patent Application No. 102015000866.8, filed Jan. 24, 2015, which is incorporated herein by reference in its entirety.

TECHNICAL FIELD

The present disclosure pertains to a roof panel particularly for the passenger cabin of a motor vehicle, and more particularly to a roof panel assembly having a composite panel and a metal frame.

BACKGROUND

In the continuing pursuit of ways to reduce the weight and also the fuel consumption of motor vehicles, it has already been suggested that plastic be used to produce various components of a vehicle body that are conventionally made from metal. A proposal for a roof panel manufactured mainly from a fiber-reinforced plastic is known for example from DE 10 2008 032 334 A1. This roof panel with a substantially flat cross section, at least in the direction transverse to the vehicle, is supported along the side edges thereof by horizontal flanges of two longitudinal lateral roof support members and fixed to the lateral sides of the longitudinal roof support members with adhesive beads.

Since plastics generally undergo considerably greater thermal expansion than metals, the expansion behavior of these conventional roof panels differs significantly from that of the metal longitudinal support members to which it is fastened. Consequently, significant compression and shearing forces occur in the adhesive beads, and over time these can cause the adhesive bond to fail.

SUMMARY

The present disclosure provides a roof panel for a motor vehicle, in which the concerns for failure of an adhesive bond with a largely metal body is minimized, despite the fact that the roof panel is primarily made of a plastic or composite material.

In accordance with one aspect of the present disclosure, the roof panel includes a panel-like composite or plastic body and a metal frame that runs continuously around a border of the plastic body. This border prevents the thermal expansion of the plastic body at high temperatures, so the expansion of the entire roof panel approximates that of an equivalent metal roof panel. Because of its uninterrupted encircling structure, the frame can absorb strong forces from the plastic body. In order to guarantee the high load-bearing capability of the roof panel, one or more of the components may be made from a fiber-reinforced plastic.

The frame protects the panel from damage by embedding the frame in plastic body, and also makes it easier to bond the roof panel to surrounding supports of the bodies of the frame not exposed, and the surface of the roof panel that comes into contact with the adhesive is made uniformly of plastic. The frame may include a single wire, which should preferably have a cross section without edges defining a simple closed curve such as a circle or an oval, thereby avoiding local concentration of the stresses arising between the plastic body and the frame, and any damage to the plastic body resulting therefrom.

The plastic body may particularly include two components secured one on top of the other, between which the frame is inserted. The components may be for example panel-like blanks; however, one of the components may also include tabs positioned around the periphery along the edge of the plastic body, which have a groove into which the frame can be inserted.

In order to prevent the frame from warping due to the effect of thermal tension, connecting wires may cross over an opening in the frame and the two ends thereof may be fastened to the frames. Like the frame itself, the connecting wires themselves are inserted between the components, particularly between two panel-like blanks. The connecting wires may form a braid or a mesh, which preferably fills in the opening in the frame uniformly. If the wires that crossed are fastened to each other at the intersection points of the braid or mesh, a significant fraction of the stress that occurs due to heating of the roof panel can be absorbed directly by the mesh, thereby relieving the frame of this load.

A groove for adhesive may extend along at least a part of the periphery of the roof panel to hold the adhesive with which it is fastened to the vehicle body. A groove for adhesive having a suitable cross section, which is open both downwardly and toward the respective periphery of the roof panel may be obtained expediently if the lower of the aforementioned components fastened one on top of the other has a shorter peripheral length than the upper component.

In order to improve the load-bearing capacity of the roof panel, it may be reinforced with ribs extending in the transverse direction. The ribs may be joined to the panel-like plastic body as a separate component during production of the roof panel. A plurality of ribs may expediently be connected as a single part in a roof arch having a comb-like cross section. The production of the roof panel may also be rendered more efficient if the ribs are constructed to form rungs of a ladder-like structural element, the side rails of which extend along lateral edges of the roof panel. The side rails may also serve to delimit the groove for adhesive.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the present disclosure or the following detailed description.

Figure 1:
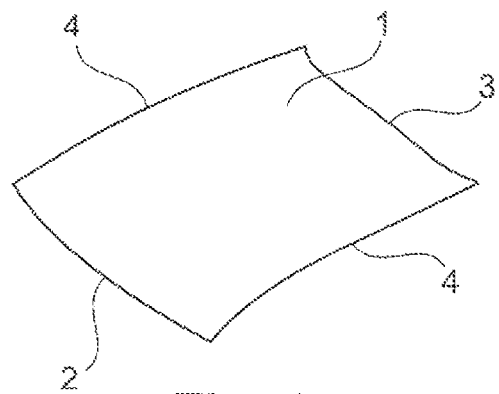
FIG. 1 is a view of the roof panel according to the present disclosure from above.
Figure 2:
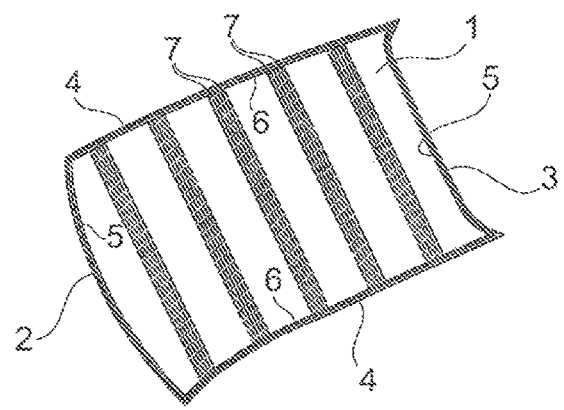
FIG. 2 is a view of the roof panel from below.

FIG. 1 shows the roof panel 1 according to the present disclosure in a view from above. The periphery of roof panel 1 includes a front edge 2 relative to the installed position of the roof panel in a motor vehicle, which is provided to serve as a border with the top edge of a windscreen, a rear edge 3 that may border the rear window or which includes a small cutaway so that it can accommodate the upper edge of a tailgate, as in the case shown here, and longitudinal edges 4. The top side of roof panel 1 is constructed with a slight convex curvature in both the longitudinal and transverse directions. This curvature limits the pressure that roof panel 1 can exert on adjacent components of the vehicle along the length thereof when it is heated. Protruding connecting elements 5, 6 extend downward along edges 2, 3, 4 on the underside of roof panel 2 visible in FIG. 2. Groups of ribs 7 extend transversely over the underside of roof panel 1, from one longitudinal edge 4 to the other.

Figure 3:
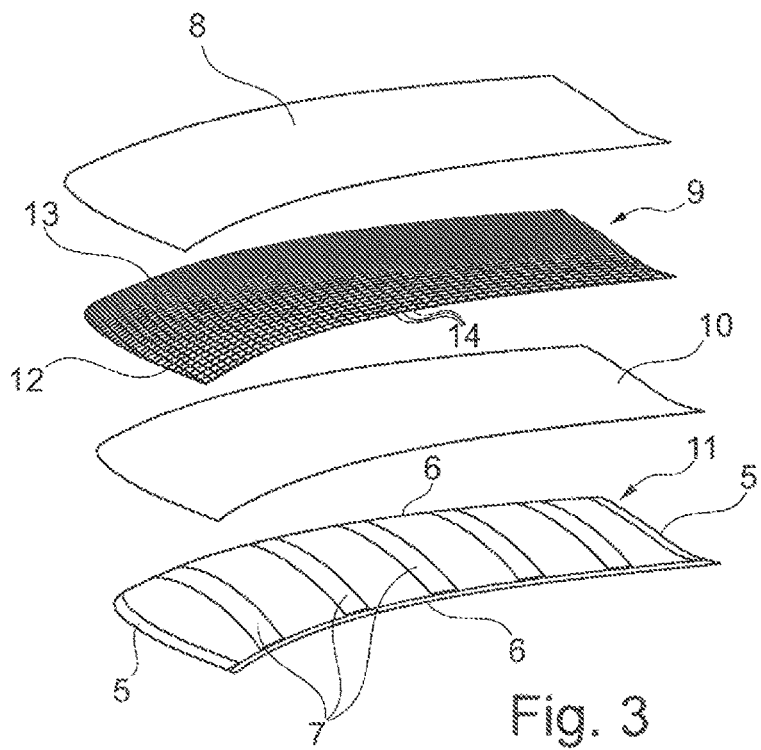
FIG. 3 is an expanded view of the components used to assemble the roof panel.
Figure 4A:
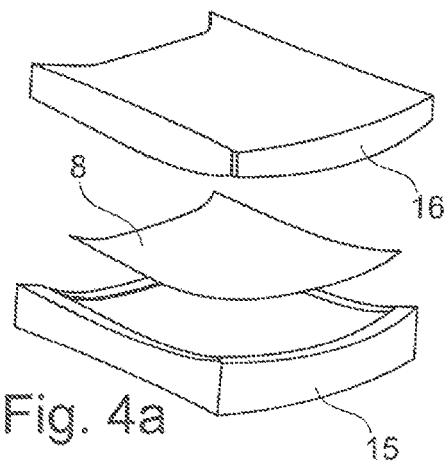
FIGS. 4a-4f illustrate the stages of a manufacturing process for the roof panel.
Figure 4B:
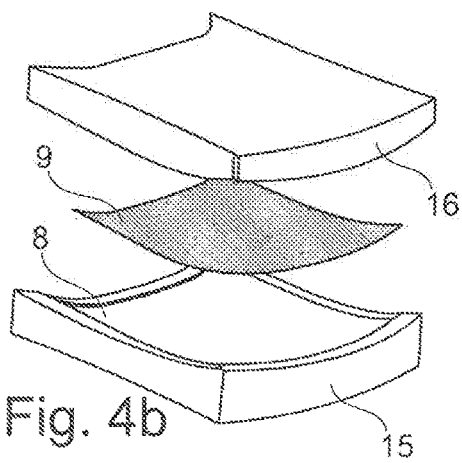
Figure 4C:
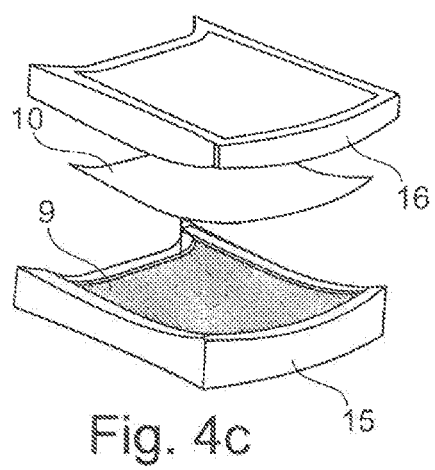
Figure 4D:
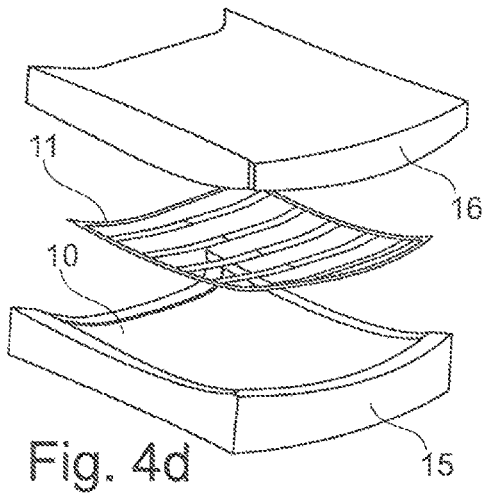
Figure 4E:
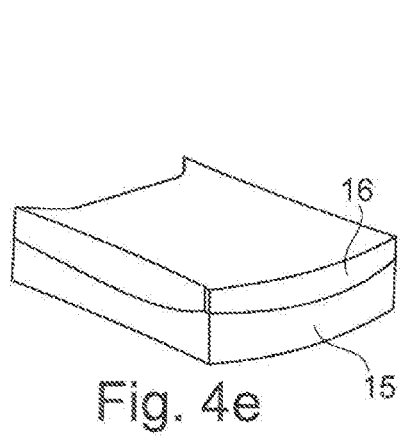
Figure 4F:
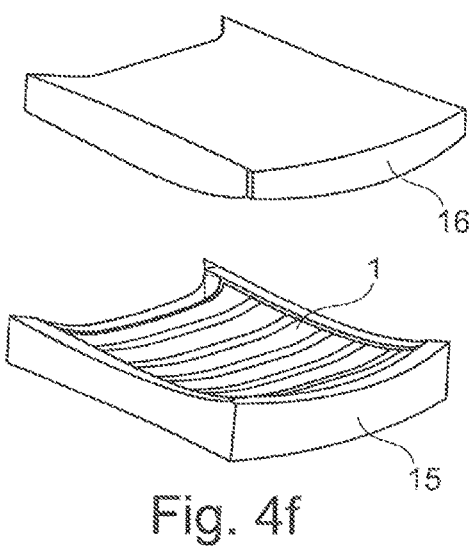

FIG. 3 shows components, from which roof panel 1 is constructed in layers. These components include, from top to bottom, an upper blank 8 made from a fiber-reinforced plastic, a perforated metal structure 9, a lower blank 10 made from fiber-reinforced plastic, and a ladder-like structural element 11 in which two side rails of the ladder structure are formed by the longitudinally aligned connecting elements 6, and connecting elements 5 and ribs 7 connect connecting elements 6 to each other like the rungs of a ladder.

Metal structure 9 includes a frame 12, in this case formed by a strong wire having a circular cross section and extending without interruption about the periphery, and a braid or mesh 13 made of thinner wires 14, the ends of which are each attached to frame 12 by spot welding or similar methods. The wires preferably have a cross section without edges which define a simple closed curve such as a circle or an oval. In the braid 13 shown in FIG. 3, wires 14 are all straight and cross each other at right angles. Wires 14 may be fastened to each other at the intersection points, by welding, soldering or winding them around each other, for example.

Components 8 to 11 are connected to the completed roof panel 1 by placing first blank 8, followed by the metal structure 9, blank 10 and structural element 11 in a molding tool lower section 15, as shown in FIG. 4a to FIG. 4f, and compressing and heating them between lower section 15 and an upper section 16 in order to soften the plastic matrices of blanks 8, 10, so that they melt and fuse with each other in the interspaces between the wires of braid 13. When a deep bond between the plastic parts of blank 8, 10 and the ladder-like structural element 11 has been created in this way, sections 15, 16 of the molding tool are separated again, and the completed roof panel 1 can be taken out.

Figure 5:
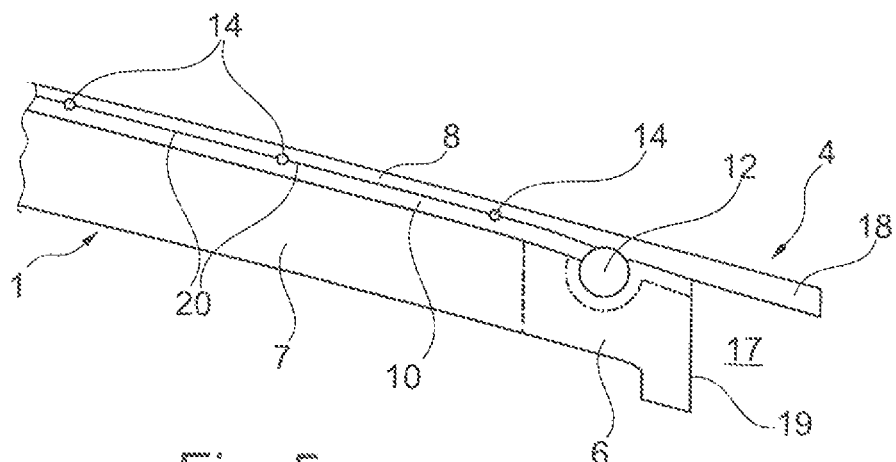
FIG. 5 is a cross section through a lateral peripheral area of the roof panel.

FIG. 5 shows the structure of the roof panel 1 obtained in this way in the form of a sectional view through a longitudinal edge 4 in a direction transverse to the vehicle. In FIG. 4, boundary lines between the blanks 8, 10 and structural element 11 have been highlighted to indicate more clearly where the plastic material of roof panel 1 from these various original components came from; in practice, the fusing of components 8, 10, 11 should advantageously be so complete that such a boundary line would no longer be clearly visible in a real section.

A groove for adhesive 17, open downwardly and to the side, extends along edge 4 and is provided to hold an adhesive bead for retaining roof panel 1 securely on a longitudinal support member (not shown), which member extends over a door of the vehicle and connects the ends of the A, B and C pillars in a manner known per se. In this context, a peripheral member 18 of roof panel 1 extending above the groove for adhesive 17 is formed solely by the original upper blank 8. A lateral flank 19 that delimits the groove for adhesive 17 on the side closest to the vehicle middle is created by one of the lateral connecting elements 6 of ladder-like structural element 11. The strong wire of frame 12 is pressed into connecting element 6 from above; or this purpose, connecting element 6 may be provided with a groove that is upwardly open from the start of the process.

The dimension of blank 10 is selected in this context such that the respective edges thereof are touching frame 12 from the inside. It would also be conceivable to select the dimensioning of blank 10 such that it is pressed into the groove of connecting element 6 together with frame 12 and extends as far as flank 19, as indicated by a dot-dashed line in FIG. 5. Under the pressure of the molding tools, the upper sides of ribs 7 are fused with blank 10, and both blanks 8, 10 are individually pressed into interspaces 20 between the wires 14 of braid 13, where they are thoroughly fused with each other.

Figure 6:
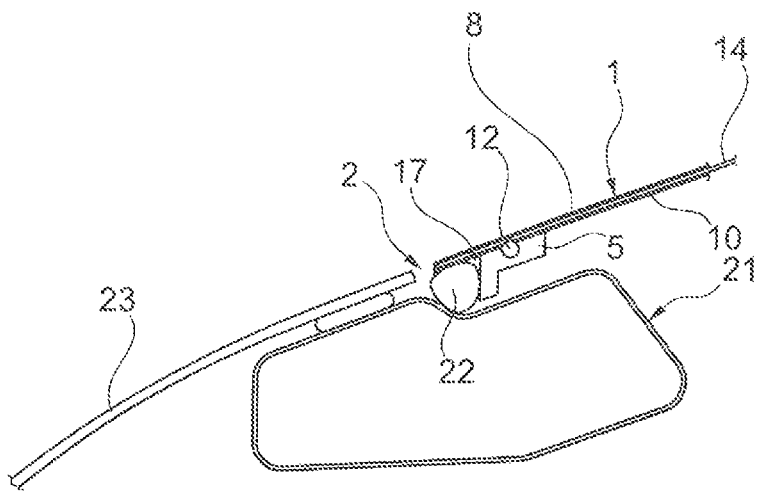
FIG. 6 is a cross section through a front peripheral area of the roof panel and a roof cross member of a vehicle body on which the roof panel is mounted.

The construction of roof panel 1 at front and rear edges 2, 3 is similar to that of the longitudinal edges 4, is shown in FIG. 6 for front edge 2. Here, frame 12 is pressed in a groove on the upper side of cross member 5, and cross member 5 in turn is fused together with blanks 8, 10 inside and outside of frame 12. A steel cross member 21 of the vehicle body, which extends between the top ends of two A pillars (not shown), supports the front edge 2 of roof panel 1 and an upper edge of windscreen 23 with an adhesive bead 22.

Figure 7:
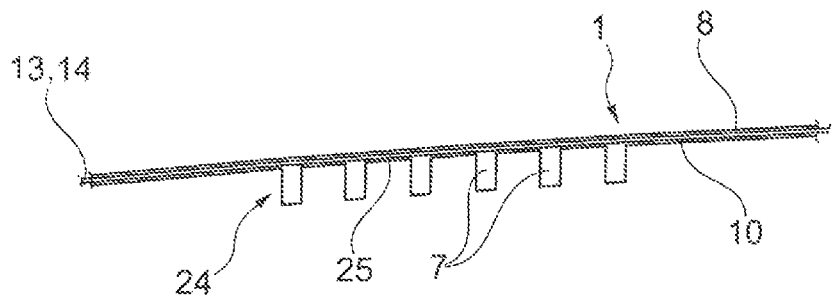
FIG. 7 is a section view in the lengthwise direction of the vehicle through a central region of the roof panel.

FIG. 7 is a sectional view in the longitudinal direction of the vehicle body through a central area of roof panel 1. The sectional plane extends transversely to a group of the ribs 7. Ribs 7 form the teeth of the comb-like cross-section of a fiber-reinforced plastic roof arch 24, which in turn forms a rung in ladder-like structural element 11. A back section 25 of the comb-like cross-section has fused with blank 10 along a dashed line. The neutral fiber in roof panel 1 extends substantially along wires 14, between the blanks 8, 10. The ribs 7 located at a distance from the neutral fiber therefore help considerably to enhance the stiffness of roof panel 1.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A roof panel for the passenger cabin of a motor vehicle comprising:
   a plastic panel that includes a first component and a second component;
   a metal frame continuously extending around a periphery along an edge of the plastic panel;
   a plurality of connecting wires that extend across an opening defined in the metal frame, the plurality of connecting wires being thinner than the metal frame, an interspace defined between the plurality of connecting wires;
   the metal frame and the connecting wire being embedded within the plastic panel between the first component and the second component, at least one of the first component and the second component being received within the interspace and fixed to the other of the first component and the second component.

2. The roof panel according to claim 1, wherein the frame comprises a wire having a cross section defining a simple closed curve.

3. The roof panel according to claim 2, wherein the wire is embedded in the plastic panel.

4. The roof panel according to claim 1, wherein at least one of the first and second components comprise a fiber-reinforced plastic panel.

5. The roof panel according to claim 1, wherein at least one of the plurality of connecting wires has two ends, wherein the at least one of the plurality of connecting wires is fastened to the frame at each of the two ends.

6. The roof panel according to claim 5, wherein the plurality of connecting wires forms a braid.

7. The roof panel according to claim 5, wherein the plurality of connecting wires forms a mesh.

8. The roof panel according to claim 7, wherein the plurality of connecting wires are fastened to each other at an intersection points of the mesh.

9. The roof panel according to claim 1, further comprising a groove extending along at least a portion of the periphery configured to receive a bead of adhesive for securing the roof panel to an adjacent body structure.

10. The roof panel according to claim 9, wherein the second component has a shorter peripheral edge than the first component such that the groove is defined between the second component and the first component.

11. The roof panel according to according to claim 1 further comprising at least one rib extending in a transverse direction to the plastic panel and joined therewith.

12. The roof panel according to claim 11, wherein the at least one rib is attached to a surface of the second component of the plastic panel, the surface of the second component facing away from the first component.

13. The roof panel according to claim 11, further comprising a plurality of ribs connected as a single part in a transverse roof arch.

14. The roof panel according to claim 13, wherein the plurality of ribs comprises a ladder-like structure having a pair of side rails extending along opposite lateral edges of the roof panel and at least one rung extending between the pair of side rails.

15. The roof panel according to claim 1, further comprising a structural element with opposing longitudinal connecting elements, opposing transverse connecting elements, and a plurality of ribs;

wherein the structural element is attached to a surface of the second component, the surface of the second component facing away from the first component;

wherein the longitudinal connecting elements and the transverse connecting elements are disposed proximate the periphery of the plastic panel, and wherein the plurality of ribs extend between the longitudinal connecting elements; and wherein the longitudinal connecting elements and the transverse connecting elements include a frame groove that receives the metal frame.

16. A roof panel for the passenger cabin of a motor vehicle comprising:

a plastic panel that includes a first component and a second component;

a perforated metal structure that includes a frame continuously extending around a periphery of the plastic panel, the perforated metal structure including a plurality of connecting wires arranged as a mesh and extending across an opening defined in the metal frame, the plurality of connecting wires being thinner than the metal frame, an interspace defined through the mesh of the plurality of connecting wires, the perforated metal structure being embedded within the plastic panel between the first component and the second component with the first component and the second component fused together via the interspace; and a structural element with opposing longitudinal connecting elements, opposing transverse connecting elements, and a plurality of ribs;

the longitudinal connecting elements and the transverse connecting elements disposed proximate the periphery of the plastic panel, and the plurality of ribs extending between the longitudinal connecting elements;

the longitudinal connecting elements and the transverse connecting elements including a frame groove that receives the frame;

the structural element being attached to a surface of the second component, the surface of the second component facing away from the first component;

the longitudinal connecting elements and the transverse connecting elements defining a flank of the roof panel, the first component extending from the flank; and an adhesive groove being defined between the flank and the first component, the adhesive groove configured to receive an adhesive configured for attaching the roof panel to a vehicle.

* * * * *